US011092273B2

(12) United States Patent
Weh et al.

(10) Patent No.: US 11,092,273 B2
(45) Date of Patent: Aug. 17, 2021

(54) COUPLING FOR TRANSFERRING FLUIDS, METHOD FOR CLOSING THE FLUID DUCT OF SUCH A COUPLING, AND PREFERRED USE OF THIS COUPLING

(71) Applicant: WEH GmbH Verbindungstechnik, Illertissen (DE)

(72) Inventors: Erwin Weh, Illertissen (DE); Wolfgang Weh, Illertissen (DE)

(73) Assignee: WEH GMBH VERBINDUNGSTECHNIK, Illertissen (DE)

( * ) Notice: Subject to any disclaimer, the term of this patent is extended or adjusted under 35 U.S.C. 154(b) by 0 days.

(21) Appl. No.: 16/770,859

(22) PCT Filed: Dec. 8, 2017

(86) PCT No.: PCT/DE2017/101051
§ 371 (c)(1),
(2) Date: Jun. 8, 2020

(87) PCT Pub. No.: WO2019/110027
PCT Pub. Date: Jun. 13, 2019

(65) Prior Publication Data
US 2020/0393071 A1 Dec. 17, 2020

(51) Int. Cl.
*F16L 37/32* (2006.01)
*F16L 37/23* (2006.01)
(Continued)

(52) U.S. Cl.
CPC .............. *F16L 37/32* (2013.01); *F16L 37/23* (2013.01); *B67D 7/3218* (2013.01); *F16L 55/1015* (2013.01)

(58) Field of Classification Search
CPC ............ F16L 55/10; F16L 37/23; F16L 37/32
See application file for complete search history.

(56) References Cited

U.S. PATENT DOCUMENTS 5,320,133 A * 6/1994 Nimberger ............ F16L 37/084
137/614.04
6,182,695 B1 2/2001 Coates, III
(Continued)

OTHER PUBLICATIONS

International Search Report and Written Opinion for PCT/DE2017/101051 dated Aug. 7, 2018.

*Primary Examiner* — Kevin L Lee
(74) *Attorney, Agent, or Firm* — Millman IP Inc.

(57) ABSTRACT

A coupling for transferring fluids is provided, having a housing and a nipple which can be fastened thereto and separated from the housing when a predetermined axial pulling force is exceeded, while overcoming a spring force, and having a fluid duct traversing the housing and the nipple, a housing-side and a nipple-side non-return valve and is routed in a radially guided manner around a vented cylindrical interior of the nipple. A closure mechanism comprises respective valve-side pins and a sleeve arranged between these pins, the sleeve being axially movable in the interior of the nipple and lockable to at least one of the pins by means of spring pressure-mounted locking elements so that, with the nipple fixed, the non-return valves are held open against their spring force, and, with the nipple released, the housing-side non-return valve is completely closed and the nipple-side non-return valve is at least partially closed.

19 Claims, 8 Drawing Sheets

(51) Int. Cl.
 *B67D 7/32* (2010.01)
 *F16L 55/10* (2006.01)

(56) References Cited

U.S. PATENT DOCUMENTS

| | | | | |
|---|---|---|---|---|
| 6,302,147 | B1 * | 10/2001 | Rose et al. | F16L 37/56 137/614.03 |
| 6,547,284 | B2 * | 4/2003 | Rose et al. | F16L 37/56 285/1 |
| 6,776,187 | B1 * | 8/2004 | Marquis et al. | F16L 37/23 137/614.03 |
| 6,899,131 | B1 | 5/2005 | Carmack | |

* cited by examiner

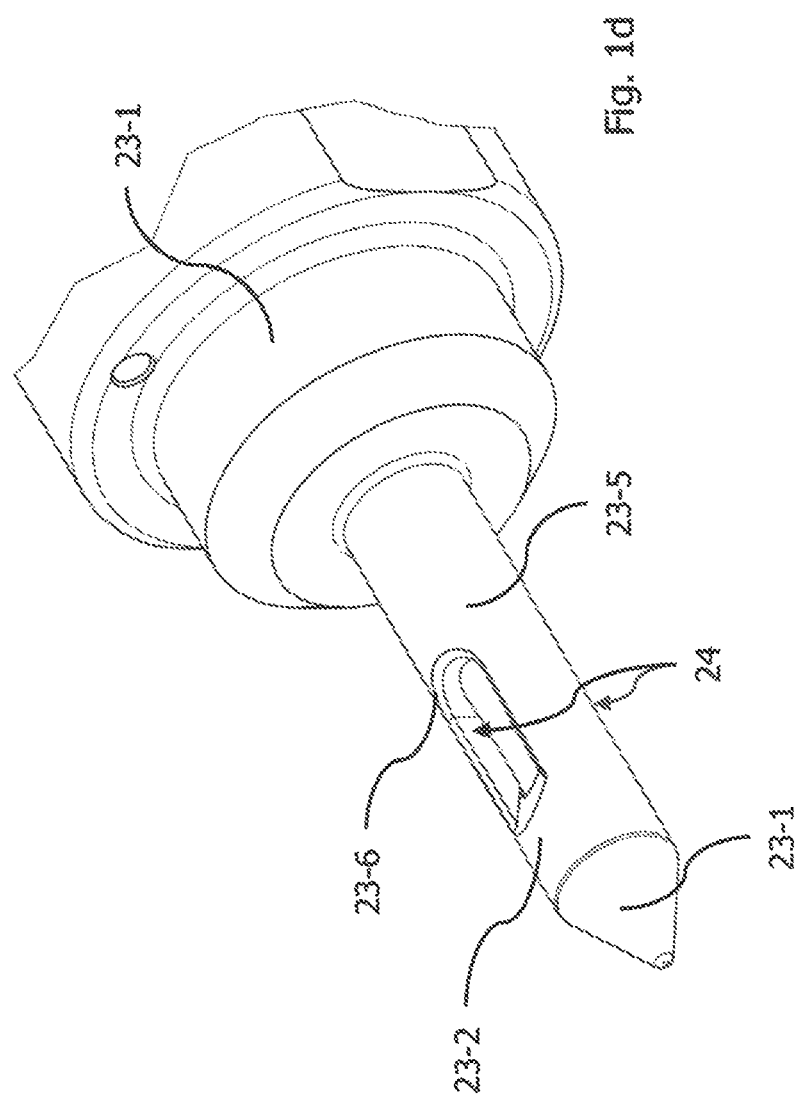

COUPLING FOR TRANSFERRING FLUIDS, METHOD FOR CLOSING THE FLUID DUCT OF SUCH A COUPLING, AND PREFERRED USE OF THIS COUPLING

PRIOR ART

The invention relates to the technical field of refuelling technology and, in particular, to a coupling for transferring fluids, a method for closing the fluid channel of such a coupling and a preferred use of said coupling.

In the hydrogen refuelling of fuel cell vehicles the vehicle is connected to the dispenser of a filling station via a filling coupling and a hose connected thereto. For safety reasons, this hose must be separated from the dispenser with a defined tensile load and then a media escape must be prevented on the hose- and dispenser side. The force, at which the breakaway must occur, is fixed to a specific range. At the same time, the challenge is that the upper and lower limit of the breakaway force may not be exceeded or be fallen below at pressures of 0 bar up to the maximum operating pressure in the complete temperature range. Therefore, it is to be excluded that the pressure produces axial forces, which substantially influence the breakaway force. In addition, the requirement exists, that the breakaway protection is tight over the complete pressure- and temperature range.

Problem Addressed by the Invention

A problem addressed by the invention is to solve the above problems and to increase the refuelling safety of a vehicle in a simple and reliable, and also cost-effective way.

Solution of the Problem

This problem is solved by a coupling for transferring fluids, which comprises a housing and a nipple which can be fixed thereto, which when a predetermined axial tensile force is exceeded can be separated from the housing by overcoming a spring force, and with a fluid channel, which passes through the housing and the nipple, in the course of which a housing-side and a nipple-side non-return valve are arranged, and which is guided in a radially directed manner around a vented cylindrical interior of the nipple, and in which a closure mechanism comprises respective valve-side pins and a sleeve arranged between said pins, which sleeve is arranged in an axially movable manner in the interior of the nipple, and can be locked by means of spring-pressure-mounted locking elements with at least one of the pins, so that when the nipple is fixed, the non-return valves are held open against their spring force, and when the nipple is released the housing-side non-return valve is completely closed and the nipple-side non-return valve is at least partially closed.

An essential point of the coupling according to the present invention thereby consists in that the extensive pressure independence can be ensured by radial pressure transfer within each case radial sealing on both sides between the part of the breakaway coupling fixed between to the dispenser and the breakaway nipple fixed on the hose. Thus, in particular, no dynamic seals are necessary any longer, which are more susceptible to maintenance and more expensive than static seals. At the same time, a single simple closing mechanism is produced for both non-return valves, which uses the spring force of the non-return valves themselves, in order to reliably close them in the event of a breakaway. The nipple-side non-return valve is thereby completely closed only when a controlled venting of the hose should not be required and can be brought about differently.

Preferred Embodiments

Preferred embodiments of the present invention are indicated in the respective dependent claims.

In a first preferred embodiment of the coupling according to the present invention, it is provided that the sleeve engages around the piston on the housing side, and can be fixed thereto by means of the locking elements and can be separated therefrom against the spring force thereof, and the pin on the housing side is guided in an axially movable manner in the piston, and is supported against the locking elements in an open state of the housing-side non-return valve. As a result, the threefold function of the fixing of the sleeve for closing the nipple-side non-return valve, the closing of the housing-side non-return valve and the separation of the nipple and the housing in the event of a breakaway is immediately ensured.

In a further preferred embodiment of the coupling according to the present invention, it is provided that the piston has at least one axial groove, into which a respective locking element engages, and which has a piston bevel, which adjoins the latter and runs continuously radially outwards towards the free end of the piston, via which the locking elements can be pressed radially outwards against their spring force when the sleeve is removed from the piston. Thus, a particularly simple and at the same reliable mechanical solution is provided for separating the sleeve from the piston while simultaneously closing the housing-side non-return valve.

In a still further preferred embodiment of the coupling according to the present invention, it is provided that the piston has a tip, which tapers continuously towards the free end of the piston, via which the locking elements can be pressed radially outwards against their spring force when the sleeve is mounted on the piston. Thus, a simple and also reliable mechanical solution is provided for (re)mounting the sleeve on the piston after a breakaway when simultaneously opening the non-return valve on the housing side.

In a still further preferred embodiment of the coupling according to the present invention, it is provided that a free end of the piston is sealed off against the fluid channel and is accommodated in the vented interior when the nipple is fixed to the housing. As a result of the accommodation in the vented interior, a counterpressure at the piston tip is excluded, which would endanger the pressure-independent functioning of the coupling.

In a still further preferred embodiment of the coupling according to the present invention, it is provided that the continuously tapering tip of the piston extends into the vented interior. As a result, not only is a counterpressure at the piston tip excluded, which would endanger the pressure-independence of the coupling, but rather at the same time the (re)mounting of the sleeve is also possible in a simple manner.

In a still further preferred embodiment of the coupling according to the present invention, it is provided that the housing-side pin is supported against the locking elements, in particular, against locking pins via an axial stop and, in particular, additionally via a retaining element engaging annularly around the pin, whereby a mechanically particularly simple closure mechanism is realized. The additional retaining element can thereby offer a particularly exact positioning and support of the locking elements, especially when these are designed as locking pins, which are applied thereto.

In a still further preferred embodiment of the coupling according to the present invention, it is provided that a ventilation channel is provided, which when the nipple is fixed to the housing connects its vented interior to a part of the nipple not comprised by the housing. Since this part can communicate directly with the environment, there is a mechanically simple and reliable ventilation of the interior, which always has the pressure level of the environment of the coupling.

In a still further preferred embodiment of the coupling according to the present invention, it is provided that the sleeve is fixedly connected to the pin on the nipple side and the latter is designed, in particular, as a cylinder pin. In principle, the sleeve does not necessarily have to be fixedly connected to the pin. However, a fixedly connected pin constitutes a simple mechanical solution, since at this point no separate part is required.

In a still further preferred embodiment of the coupling according to the present invention, it is provided that the fluid channel in a region of the locking elements, in particular, in a radial position plane of the locking elements, runs radially through the sleeve from the piston. As a result, the material thickness in the region of the locking elements can be utilized to achieve a compact design, as well as an axial guidance of the fluid between the sleeve and the nipple housing. In principle, it would thereby also be conceivable, to equip or to surround the locking pins themselves with a fluid channel.

In a still further preferred embodiment of the coupling according to the present invention, it is provided that the nipple is fixed against separation from the housing by a predetermined axial tensile force by means of a combined ball-/spring securing means. Thus, a defined breakaway protection is created, which also meets all of the standard regulations. Preferably, the combined ball-/spring securing means for inserting the nipple into the housing can thereby be pretensioned by means of an eccentric mechanism. This permits, in particular, a particularly simple (re)mounting of the nipple in the housing.

The above problem is also solved by a method for closing the fluid channel of a described coupling, in which a predetermined axial tensile force is overcome and the nipple is released from the housing, and a nipple-side non-return valve is at least partially closed by an axial movement of the nipple relative to the sleeve and a housing-side non-return valve is completely closed by an axial movement of the nipple together with the sleeve.

An essential point of the method according to the present invention thereby consists in its simple procedure for closing both non-return valves, which ensures an equally reliable and safe breakaway of the nipple. In particular, this method does not require any change in the usual user behavior when refuelling a vehicle, which would otherwise dictate certain courses of action, testing processes and safety precautions.

In a preferred embodiment of the method according to the present invention, it is provided that the combined ball-/spring securing means is pretensioned via the eccentric mechanism, the nipple is inserted into the housing and is fixed by relaxing the combined ball-/spring securing means. Thus, in particular, a particularly simple (re)mounting of the nipple in the housing is possible, which can be carried out using a conventional tool.

Due to the particularly high reliability and simple handling of the above described coupling, this should preferably be used for refuelling vehicles, in particular, with hydrogen, natural gas and liquefied gas. Even at the high pressure levels in the case of hydrogen refuelling a tightness is thereby ensured even in the event of a breakaway.

It is understood that the features mentioned above and still to be explained below can be used not only in the respectively specified combination, but also in other combinations or in isolation without departing from the scope of the present invention.

SHORT DESCRIPTION OF THE FIGURES

Preferred embodiments of the invention are depicted in the drawings and are elucidated in detail in the following description, wherein identical reference signs relate to identical or similar or functionally identical components.

FIG. 1b shows an enlarged longitudinally sectioned side view of the closure mechanism of the coupling of FIG. 1a;

FIG. 1c shows an enlarged longitudinally sectioned perspective view of the closure mechanism of the coupling of FIG. 1a;

FIG. 1d shows an enlarged perspective view only of the piston of the coupling of FIG. 1a, and FIGS. 2 to 5 show respective longitudinally sectioned side views of the coupling according to the present invention of FIG. 1 in the event of a breakaway.

Figure 1A:
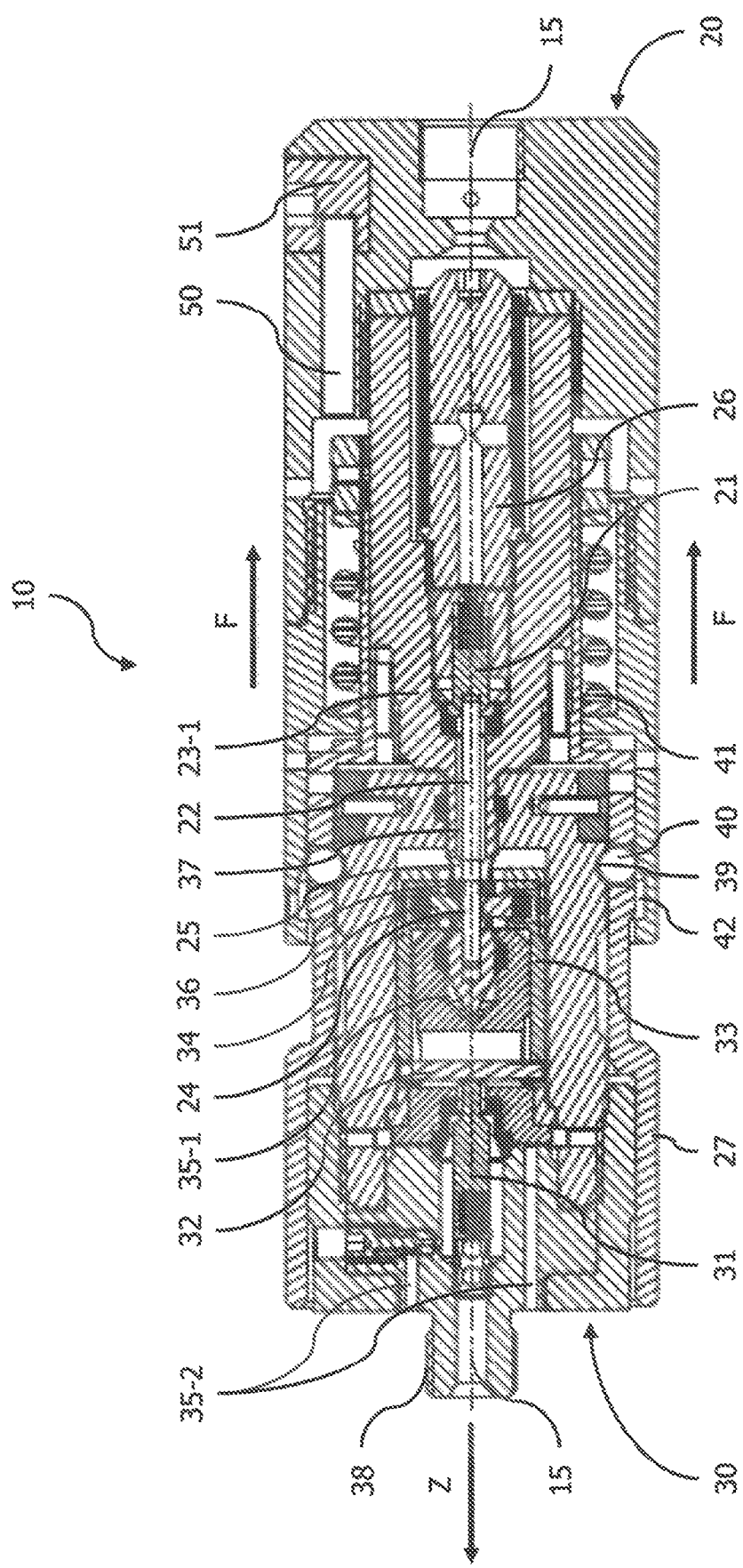
FIG. 1a shows a longitudinally sectioned side view of a coupling according to the present invention in the connected state.

FIG. 1a shows a longitudinally sectioned side view of a coupling 10 according to the present invention in the connected state. The coupling 10 thereby comprises a housing 20, which can be connected to a dispenser (not depicted), and a nipple 30 fixed to said housing 20, which in turn can be connected via a hose, which can be attached thereto, to a filling coupling (both not depicted).

In said coupling 10, a medium coming from the dispenser flows into a fluid channel 15, is then passed through a filter 26 and subsequently passes through a housing-side non-return valve 21, which is accommodated in a piston 23-1 and is mechanically prevented from closing by a housing-side pin 22. Subsequently, the medium flows through an annular gap 37 between the piston 23-1 and the housing-side pin 22 and is then guided radially outwards. Finally, the medium flows around a vented interior 35-1 of a sleeve 33, which is axially movably mounted in the nipple 30, is guided radially inward again and then passes through a nipple-side non-return valve 31, which is also mechanically prevented from closing by a nipple-side pin 32. The medium then leaves the coupling 10 via a threaded connection 38. The vented interior 35-1 is thereby connected to the environment via at least one ventilation channel 35-2 running solely in the nipple 30.

The closure mechanism for preventing the closing of the housing-side and nipple-side non-return valves 21 and 31 thereby provides that these are prevented from closing against their respective spring forces in the connected state of the coupling 10 by means of the housing-side and nipple-side pins 22 and 32. The nipple-side non-return valve 31 bears against the pin 32, which is mounted transversely in the sleeve 33 surrounding the vented interior 35-1. Said pin 32 is here fixedly connected to the sleeve 33, but can also be designed as a separate part. The sleeve 33 comprises one or a plurality of spring-mounted locking pins 34, which are directed radially inward. The housing-side pin 22 has a retaining element 36 mounted thereon, via which it is supported against the locking pins 34. On the other hand, the housing-side pin 22 is mounted on the non-return valve 21 and holds the latter open against its spring force.

In the event of a breakaway, the nipple 30, via a plurality of balls 40 holding together the housing 20 and the nipple 30, pulls a housing bush 27 along with it against the force F of a spring 41 in the breakaway direction of a tensile force Z, until the entrained balls 40 can deflect outwards into an unlocking groove 42, which is integrated in the stationary part of the housing 20 and thus release the nipple 30. As a result of the axial movement of the nipple 30, the above described closure mechanism is thereby released between the two non-return valves 21 and 31, whereby these are pressed against their respective sealing seat due to the spring forces applied to them and prevent the medium from escaping at both separating components 20 and 30. The release of the connection takes place by the sleeve 33 being displaced in the breakaway direction, whereby the locking pins 34 mounted in the sleeve 33 are pulled out of the axial groove 24 of the piston 23-1 via a piston bevel 23-3 and are thereby pushed radially outwards against a spring force, until the piston head 23-2 is overcome.

As a result of the direct mechanical incorporation of the non-return valves 21 and 31 in the closure mechanism, in particular, no alternative or additional dynamic sealing of both components 20 and 30 is required, which in addition makes possible a use of standardized components. In addition, a pressure-independent breakaway force Z can be ensured by surface-compensating sealing cross sections.

For (re)mounting the nipple 30 on the housing 20, an eccentric mechanism is provided, which permits the spring 41 to be pretensioned by means of a bolt 50, which is displaceably mounted in the housing 20, and which can be moved by rotation of an eccentric 51 in the direction of the spring 41. Thus, a simple insertion of the broken-away nipple 30 into the housing bush 27 is possible, because the latter moves into a position, in which the balls 40 of the ball-/spring securing means are accommodated in the unlocking groove 42 and do not block the nipple 30. Only when the bolt 50 is retracted does the housing bush 27 also move back again into a position, in which the balls 40 are pressed radially inwards and engage in the locking groove 39 of the nipple 30, via which a fixing of the nipple 30 on the housing 20 takes place.

Figure 1B:
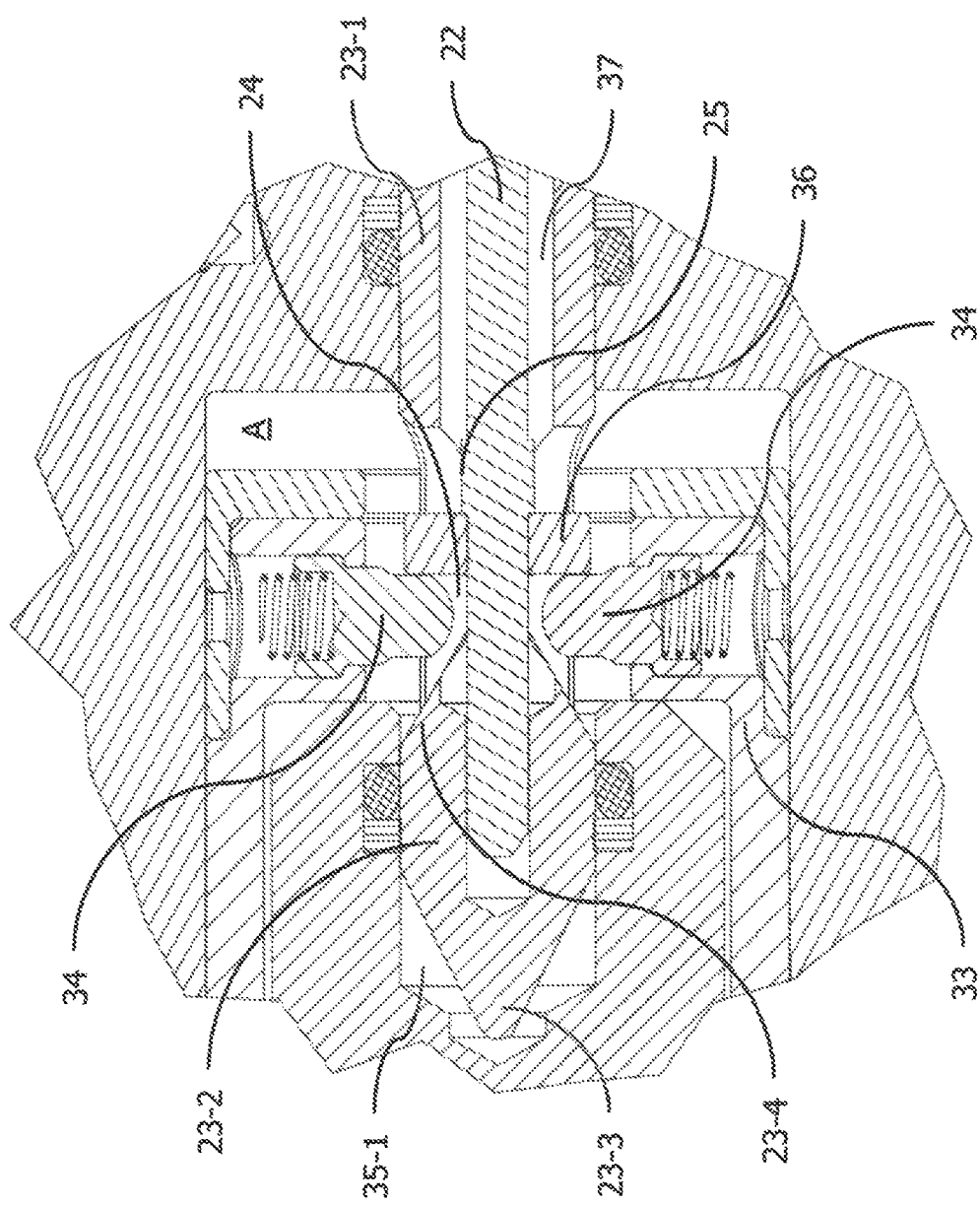

FIG. 1b shows an enlarged longitudinally sectioned side view of the closure mechanism of the coupling 10 of FIG. 1a, in which the locking pins 34 of the sleeve 33 subjected to spring pressure are latched in an axial groove 24 of the piston 23-1. In the state, in which the nipple 20 is fixed to the housing 30, the pin 22 on the housing-side is loaded by the spring force of the non-return valve 21, against which the pin 22 on the housing side rests, in order to hold it open. The housing-side pin 22 would therefore like to deflect to the left, which is prevented by the locking pins 34, against which the housing-side pin 22 is supported by means of a stop 25 attached thereto and a retaining element 36, which in turn bears against it. The medium in this position of the closure mechanism can flow through the annular gap 37 and is finally deflected radially outwards and flows around the sleeve 33. The fluid channel 15 is sealed off on the piston head 23-2 against the vented interior 35-1 of the sleeve 33 by means of an axial sealing, and a further axial sealing is provided in the region of its shaft against the nipple 30.

In the event of a breakaway, the sleeve 33 now moves to the right against the rest of the nipple 30, wherein the nipple-side non-return valve 31 is closed, because the nipple-side pin 32 also moves with it and relieves the non-return valve 31, so that it engages in its sealing seat and closes the hose-side fluid channel 15. With a change in the equilibrium of forces on the sleeve 33, however, at latest after overcoming the distance A the sleeve 33 moves in a movement-coupled manner with the rest of the nipple 30 to the left, wherein now the housing-side non-return valve 21 is also closed, because the housing-side pin 22 also moves with it and relieves the non-return valve 21, so that it likewise engages in its sealing seat and closes the dispenser-side fluid channel 15. The sleeve 33 then moves still further to the left, wherein the locking pins 34 now move radially outwards against their spring force along the piston bevel 23-4 and are finally freed from the piston head 23-2. Finally, the sleeve 33 can be separated from the housing 20, via the vented interior 35-1, in which the piston tip 23-3 is accommodated, since no counterpressure is built up. Conversely, the sleeve 33 can be easily inserted into the housing bush 27 via the piston tip 23-3 when the nipple 30 is (re)mounted, since the locking pins 34 are thereby pressed radially outwards against their respective spring force in a similar manner to when the nipple 20 breaks away and finally be latched again in an axial groove 24.

Figure 1C:
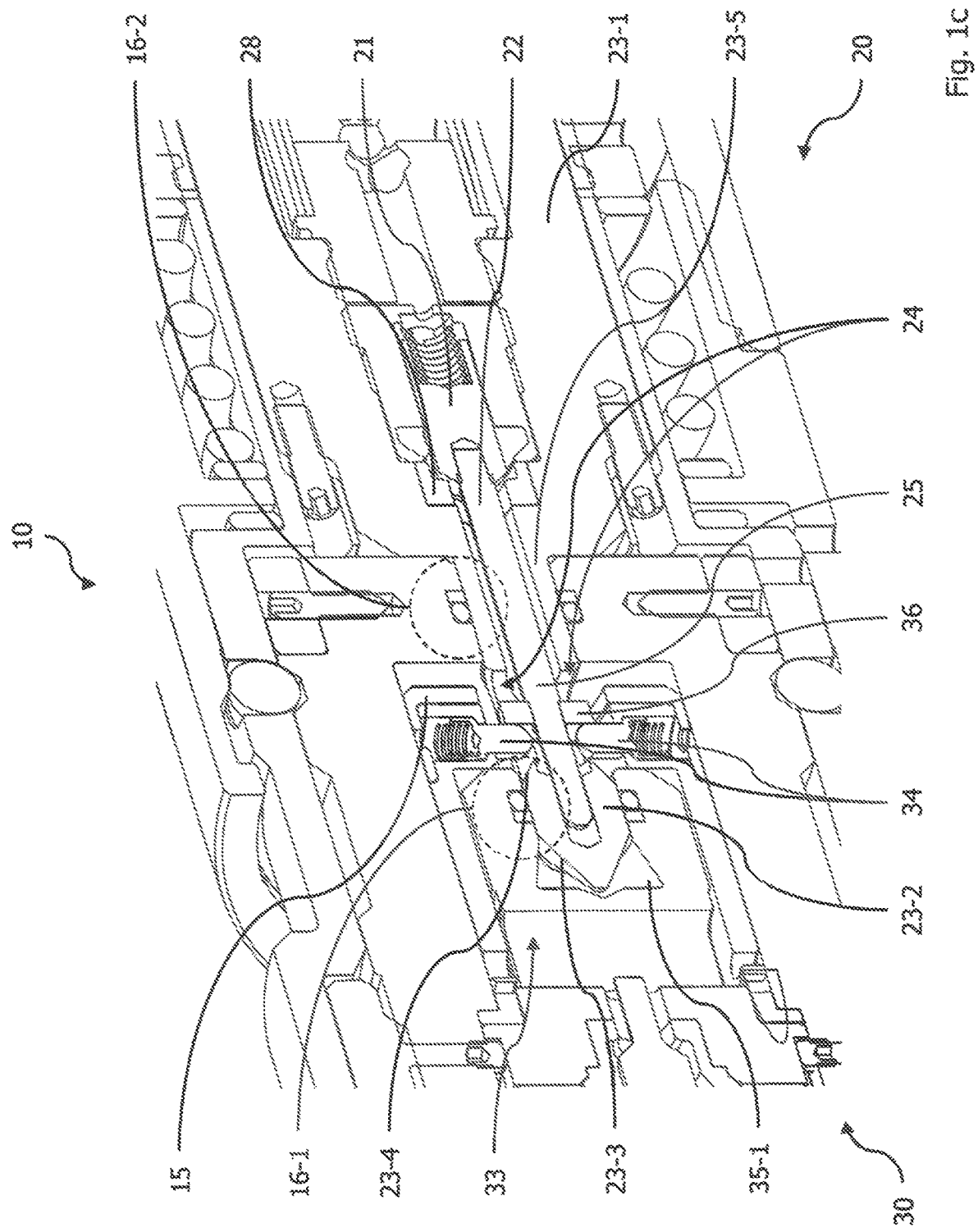

FIG. 1c shows an enlarged longitudinally sectioned perspective view of the closure mechanism of the coupling 10 from FIG. 1a for a better understanding of the engagement of the spring-mounted locking elements 34 in opposite axial grooves 24 of the piston 23-1. The housing-side pin 22 bears against these locking elements 34 and holds the housing-side non-return valve 21 open relative to the seal 28 forming the valve seat. The housing-side pin 22 is thereby supported against the locking element 34 via a radial stop 25 formed thereon and a retaining element 36 which in turn rests against it, which are designed here as spring-mounted pins with a hemispherically-shaped head. Until the housing-side non-return valve 21 is completely closed, the locking elements 34 can move along the axial grooves 24, until they—upon further movement of the sleeve 33—are pressed radially outward against the spring force via the piston bevel 23-4 and are pulled via the piston head 23-2 and finally the piston tips 23-3. The retaining element 36 is thereby designed so that, on the one hand, it engages around the housing-side pin 22 and, on the other hand, has opposite cams, which are guided into the respective axial grooves 24, whereby independent of a possible rotation of the housing-side pin 22 an always defined stop is formed relative to the locking pins 34. A removal of the sleeve 33 from the piston head 23-2 is ensured in that the vented interior 35-1 does not build up any counterpressure, which could counteract this movement. The fluid channel is sealed off from the vented interior 35-1 and the environment via respective annular seals 16-1 and 16-2 on the piston head 23-2 or on the piston shaft 23-5.

FIG. 1d shows an enlarged perspective view only of the piston 23-1 of the coupling 10 of FIG. 1a for better visibility of the opposite axial grooves 24. In his embodiment, these are designed as a slot-like milled-out portion, which, in particular, has a circumferential chamfer 23-6 on its outer edge. This chamfer 23-6 serves for deburring the piston 23-1, and can be attached, for example, by means of only a milling operation, to the axial groove 24 together with the piston bevel 23-4.

FIGS. 2 to 5 show respective longitudinally sectioned side views of the coupling according to the present invention of FIG. 1 in the event of a breakaway.

Figure 2:
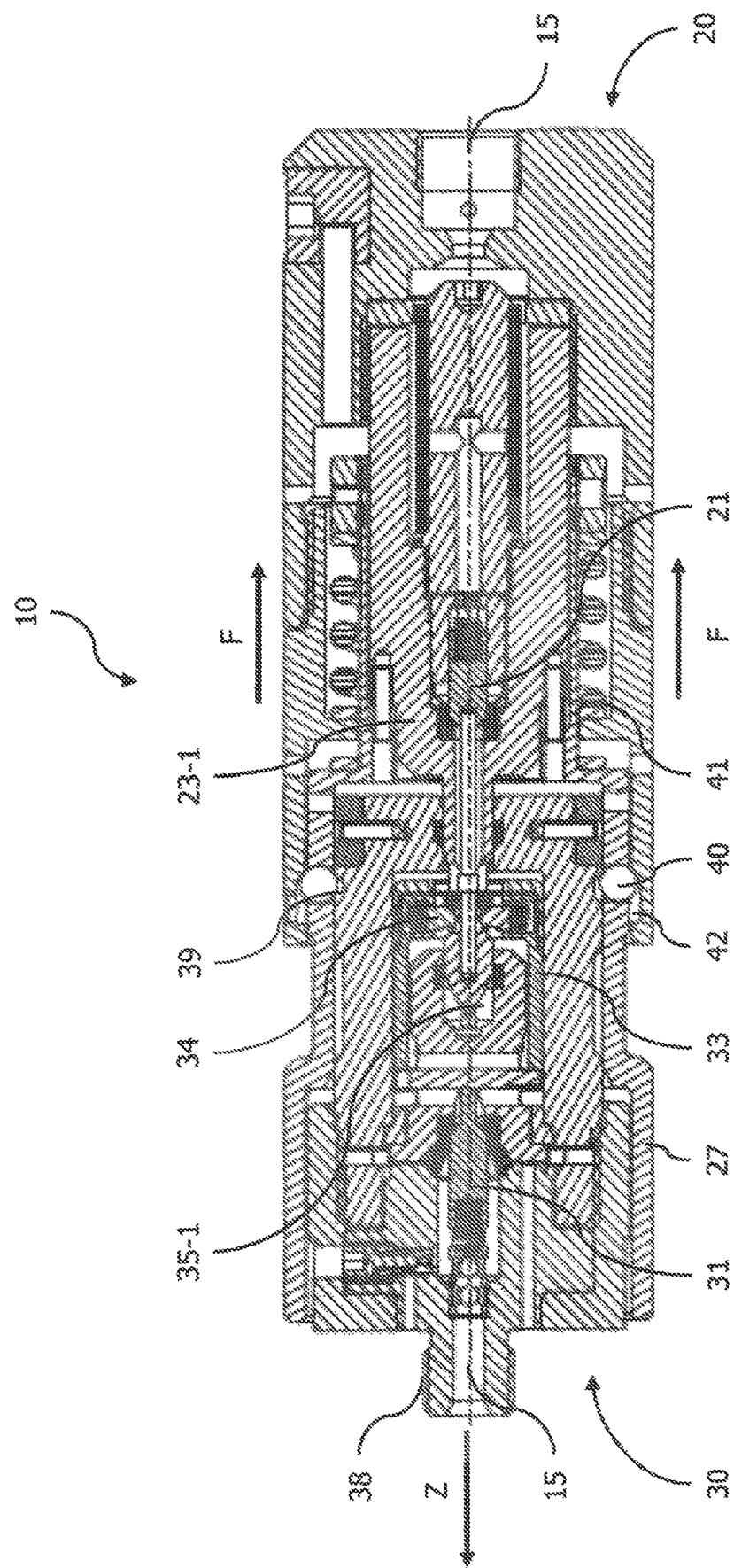

Starting from the connected state of nipple 30 and housing 20 in FIG. 1a, FIG. 2 thereby shows a first position of the nipple 30 on the housing 20, after the tensile force Z on the nipple 30 has exceeded a force F of the spring 41. The nipple has thereby moved together with the housing bush 27 against the spring force F so far to the left, that the balls 40 of the ball-/spring securing means can deflect almost into the unlocking groove 42, in any case due to the movement of the sleeve 33 opposite the movement of the housing bush 27 to the right, the nipple-side non-return valve 31 has already been closed, but at least partially closed. Thus, a reliable hose-side sealing of the fluid channel 15 takes place already in this breakaway state.

Figure 3:
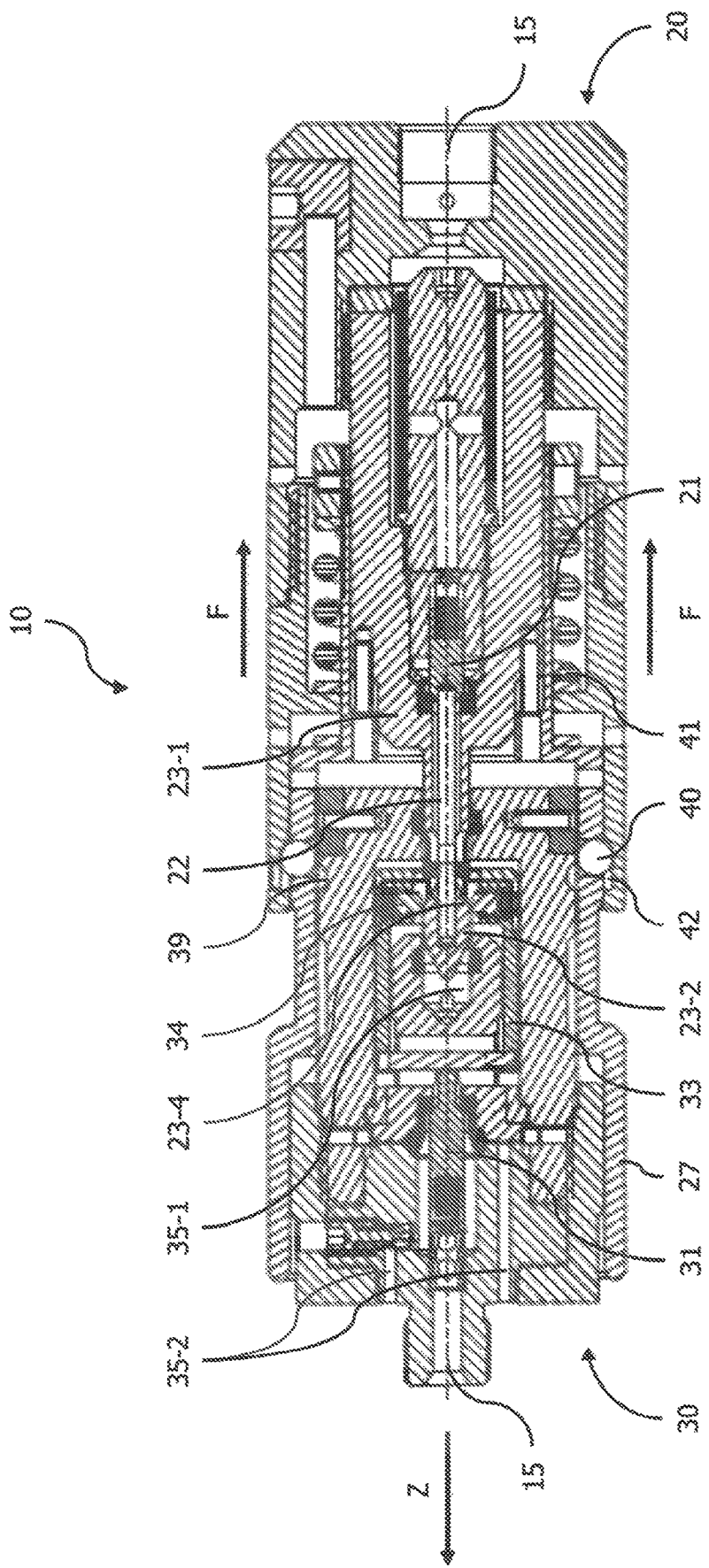

FIG. 3 shows a second position of the nipple 30 on the housing 20, in which the balls are completely engaged in the unlocking groove 42 and are completely disengaged from the locking groove 39. The nipple 30 is thus no longer fixed on the housing 20 and at the latest now takes the sleeve 33 with it to the left, wherein the locking pins 34 are pressed radially outwards against their respective spring force along the piston bevel 23-4. As a result, the piston head 23-2 of the piston 23-1 is pulled out of the vented interior 35-1, which is connected to the environment via at least one ventilation channel 35-2 in order to avoid a counterpressure. With the sleeve 33 and its locking pins 34 the housing-side pin 22 also moves to the left under the spring load of the housing-side non-return valve 21, until the latter engages in the sealing seat and also closes the dispenser-side fluid channel 15.

Figure 4:
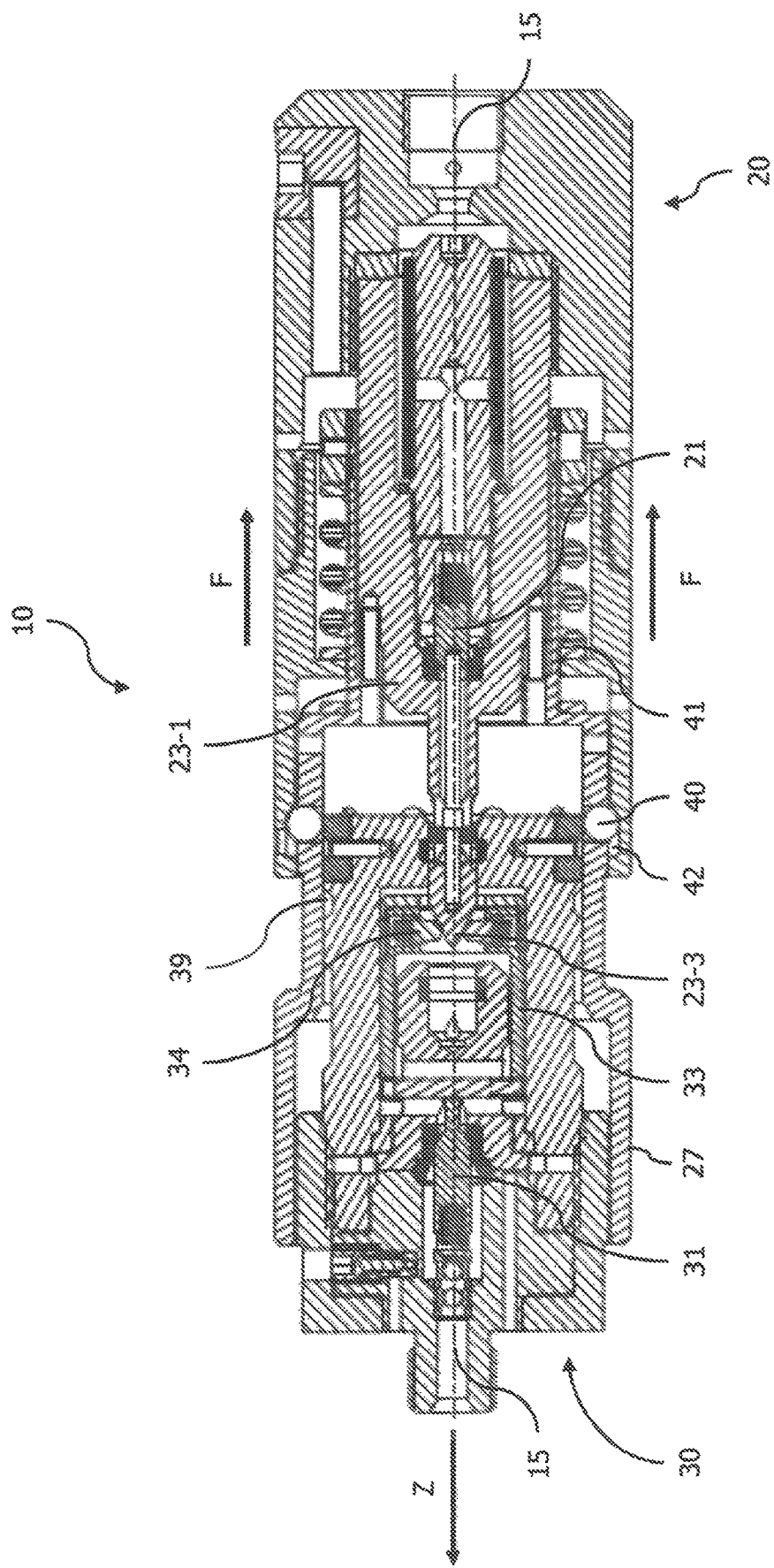

FIG. 4 shows a third position of the nipple on the housing 20, in which both the nipple-side non-return valve 31—depending on its specific design—is at least partially closed, and the housing-side non-return valve 21 is completely closed. Despite the breakaway of the nipple 30, an uncontrolled release of the medium is no longer possible either on the hose side or on the dispenser side. In this position, the locking pins 34 slide radially inwards on the piston tip 23-3 under spring pressure and the sleeve 33, as well as the nipple 30, is free.

Figure 5:
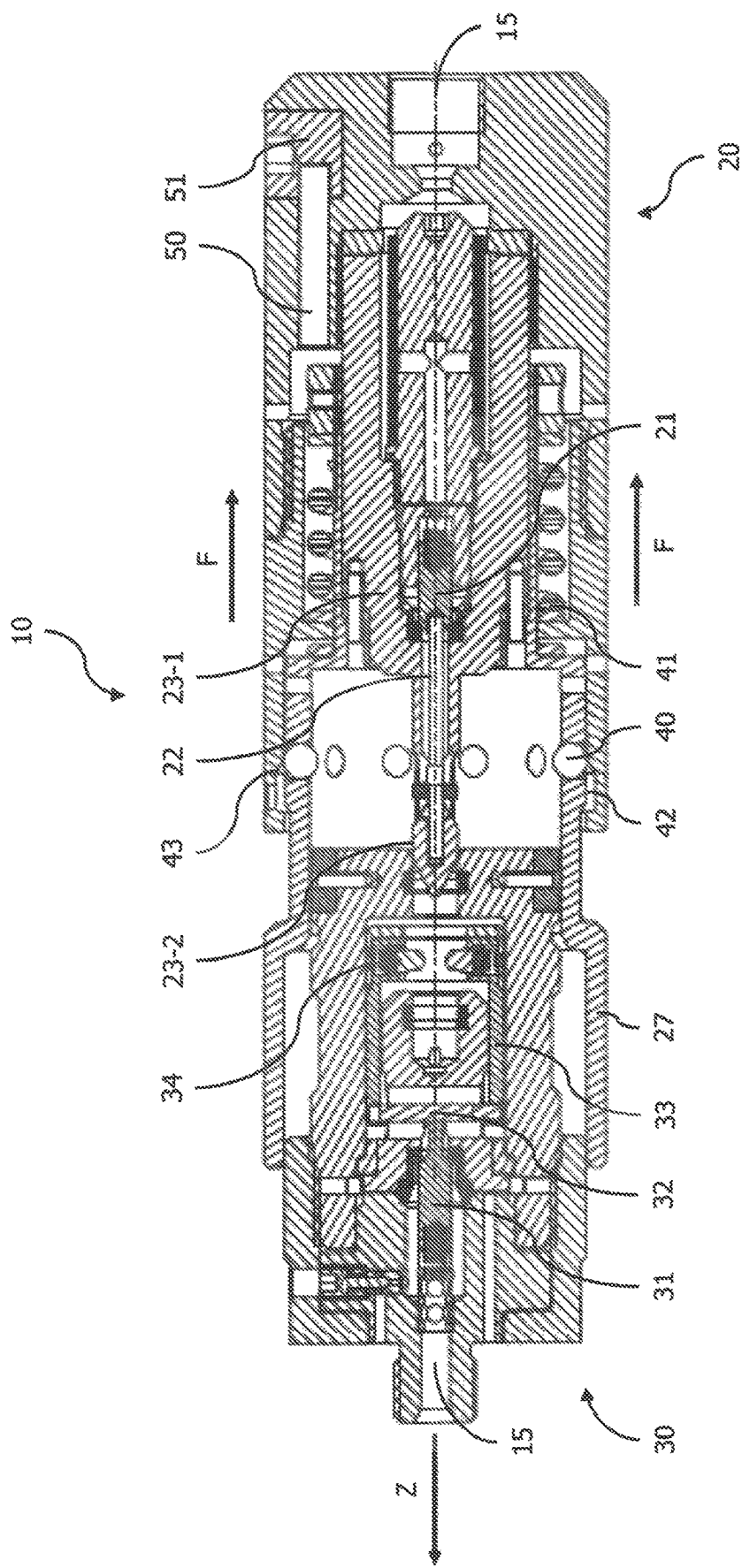

FIG. 5 finally shows a fourth position of the nipple 30 on the housing 20, in which the nipple 30 can slide freely in the housing bush 27 and can be separated from the housing 20. In this position, the balls 40 of the ball-/spring securing means are again released from the unlocking groove 42, since the latter are no longer blocked by the nipple 30 in front of them. The housing sleeve 27 unlocked in this way is then retracted under the influence of the force F of the spring 41, wherein the balls 40 are guided radially inward via a groove bevel 43.

In the decoupled state of the coupling 10, a rapid (re) mounting of the nipple 30 on the housing 20 is thus not readily possible, since the balls 40 would block an insertion of the nipple 30. In order nevertheless to return the balls 40 back into the locking groove 42 against the force F of the spring 41, an eccentric mechanism is provided on the housing 20, which comprises a longitudinally displaceable bolt 50 and an eccentric 51 for moving the bolt 50 in the direction of the spring 41. The eccentric 51 thereby has an engagement accessible from the outside for attaching a tool, with which it can be operated. By means of the bolt 50 displaced to the left, the spring 41 can thereby be pretensioned so that the housing bush 27 is load-free, when the balls 40 come to lie above the locking groove 42. The nipple 30 can thus be simply inserted into the housing bush 27 and via the relief of the spring 41 by means of the eccentric mechanism 50, 51 can be fixed on the housing 20. The locking pins 34 thereby slide over the piston tip 23-2 and engage behind the piston head 23-2 into an axial groove 24 of the piston 23-1. In this state, the nipple-side non-return valve 31 is opened via the nipple-side pin 32, which is connected to the sleeve 33. On the other hand, the housing-side non-return valve 21 is also opened via the pin 22 guided in the piston 23-1, which bears against the locking pins 34 via the stop 25 and the retaining element 36.

In sum, the refuelling safety of a vehicle is thus increased with the coupling according to the present invention in a simple and reliable manner, and also a cost-effective manner, even in the unusual case, in which a breakaway of the hose should occur.

LIST OF REFERENCE SIGNS

10 Coupling
15 Fluid channel
16-1 Annular seal
16-2 Annular seal
20 Housing
21 Housing-side non-return valve
22 Housing side pin
23-1 Piston
23-2 Piston head
23-3 Piston tip
23-4 Piston bevel
23-5 Piston shaft
23-6 Chamfer
24 Axial keyway
25 Stop position
26 Filter
27 Housing bush
28 Seal
30 Nipple
31 Nipple-side non-return valve
32 Nipple-side pin
33 Sleeve
34 Locking elements
35-1 Vented interior
35-2 Ventilation channel
36 Retaining element
37 Annular gap
38 Threaded connection
39 Locking groove
40 Ball
41 Spring
42 Unlocking groove
43 Groove bevel
50 Bolt
51 Eccentric
A Distance
F Spring force
Z Tensile force

The invention claimed is:

1. A coupling for transferring fluids, having a housing and a nipple which can be fixed thereon, which can be separated from the housing when a predetermined axial tensile force is exceeded while overcoming a spring force, and having a fluid channel which passes through the housing and the nipple, in the course of which a housing-side and a nipple-side non-return valve are arranged, and which is guided in a radially directed manner around a vented cylindrical interior of the nipple, and in which a closure mechanism comprises a housing-side pin and a nipple-side pin and a sleeve arranged between said pins, which is arranged in an axially movable manner in the interior of the nipple, and can be locked by means of spring-pressure-mounted locking elements with the housing-side pin, such that when the nipple is fixed the non-return valves are held open against their spring force, and when the nipple is released the housing-side non-return valve is completely closed and the nipple-side non-return valve is at least partially closed, and in which the sleeve engages around a housing-side piston, and via the locking elements can be fixed thereto and can be separated therefrom against the spring force, and the housing-side pin is guided in an axially movable manner in the piston, and is supported in an open state of the housing-side non-return valve against the locking elements.

2. The coupling according to claim 1, in which the piston has at least one axial groove, into which a respective locking element engages, and which has a piston bevel adjacent the at least one axial groove and extending continuously radially outwards towards a free end of the piston, via which the locking elements can be pressed radially outwards against their spring force when the sleeve is removed from the piston.

3. The coupling according to claim 1, in which the piston has a tip, which tapers continuously towards a free end of the piston, via which the locking elements can be pressed radially outwards against their spring force when the sleeve is mounted on the piston.

4. The coupling according to claim 1, in which a free end of the piston is sealed off against the fluid channel and is accommodated in the vented cylindrical interior when the nipple is fixed to the housing.

5. The coupling according to claim 3, in which the continuously tapering tip of the piston extends into the vented cylindrical interior.

6. The coupling according to claim 1, in which the housing-side pin is supported against the locking elements.

7. The coupling according to claim 1, in which a ventilation channel is provided, which when the nipple is fixed to the housing connects its vented cylindrical interior to a part of the nipple not comprised by the housing.

8. The coupling according to claim 1, in which the sleeve is fixedly connected to the pin on the nipple side.

9. The coupling according to claim 1, in which the fluid channel in the region of the locking elements runs radially through the sleeve from the piston.

10. The coupling according to claim 1, in which the nipple is fixed against separation from the housing by the predetermined axial tensile force by means of a combined ball/spring securing means.

11. The coupling according to claim 10, in which the combined ball/spring securing means for inserting the nipple into the housing can be pretensioned by means of an eccentric mechanism.

12. A method for closing the fluid channel of a coupling according to claim 1, in which the predetermined axial tensile force is overcome and the nipple is released from the housing, and the nipple-side non-return valve is at least partially closed by an axial movement of the nipple relative to the sleeve and the housing-side non-return valve is completely closed by an axial movement of the nipple together with the sleeve.

13. The method according to claim 12, in which the combined ball/spring securing means is pretensioned via the eccentric mechanism, the nipple is inserted into the housing and is fixed by relaxing the combined ball/spring securing means.

14. A use of a coupling according to claim 1 for refueling vehicles.

15. The coupling according to claim 6, wherein the locking elements against which the housing-side pin is supported are locking pins, and the housing-side pin is supported against the locking pins via an axial stop.

16. The coupling according to claim 15, in which the housing-side pin is supported against the locking elements additionally via a retaining element, which engages annularly around the pin.

17. The coupling according to claim 8, wherein the pin is a cylinder pin.

18. The coupling according to claim 9, wherein the region of the locking elements is in a radial position plane of the locking elements.

19. The use of a coupling according to claim 14 for refueling vehicles with hydrogen, natural gas or liquefied gas.

* * * * *